US008564861B2

(12) United States Patent
Henderson

(10) Patent No.: US 8,564,861 B2
(45) Date of Patent: Oct. 22, 2013

(54) PROVIDING CALIBRATION DATA FOR PRINTER

(75) Inventor: Thomas A. Henderson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 426 days.

(21) Appl. No.: 12/956,188

(22) Filed: Nov. 30, 2010

(65) Prior Publication Data

US 2012/0133960 A1    May 31, 2012

(51) Int. Cl.
*G03F 3/08* (2006.01)
*H04N 1/46* (2006.01)

(52) U.S. Cl.
USPC ........... 358/518; 358/1.9; 358/3.26; 358/504; 358/521; 358/523

(58) Field of Classification Search
USPC .................................. 358/1.9, 518, 521, 523
See application file for complete search history.

(56) References Cited

U.S. PATENT DOCUMENTS

| | | | |
|---|---|---|---|
| 2,434,651 A | 1/1948 | Hardy | |
| 6,441,923 B1 | 8/2002 | Balasubramanian et al. | |
| 6,450,606 B1 * | 9/2002 | Kato et al. | 347/19 |
| 6,474,768 B1 * | 11/2002 | Yano et al. | 347/19 |
| 6,494,557 B1 * | 12/2002 | Kato et al. | 347/19 |
| 6,567,170 B2 | 5/2003 | Tandon | |
| 6,608,641 B1 | 8/2003 | Alexandrovich et al. | |
| 6,637,861 B2 * | 10/2003 | Yamamoto | 347/43 |
| 7,069,164 B2 | 6/2006 | Viturro | |
| 7,120,379 B2 | 10/2006 | Eck | |
| 7,123,384 B2 | 10/2006 | Koifman | |
| 7,271,935 B2 * | 9/2007 | Coons et al. | 358/2.1 |
| 7,548,343 B2 | 6/2009 | Ng et al. | |
| 8,325,393 B2 * | 12/2012 | Yamamoto | 358/505 |
| 2002/0158933 A1 * | 10/2002 | Yamamoto | 347/15 |
| 2002/0168200 A1 | 11/2002 | Stelter et al. | |
| 2006/0133870 A1 | 6/2006 | Ng et al. | |
| 2007/0146829 A9 * | 6/2007 | Coons et al. | 358/504 |
| 2008/0007802 A1 * | 1/2008 | Viturro et al. | 358/504 |
| 2009/0059322 A1 * | 3/2009 | Vanduyn et al. | 358/504 |
| 2009/0296118 A1 * | 12/2009 | Tsukamoto | 358/1.9 |
| 2010/0097657 A1 | 4/2010 | Kuo et al. | |
| 2010/0202005 A1 * | 8/2010 | Viturro et al. | 358/1.9 |

FOREIGN PATENT DOCUMENTS

JP    2010103606 A  *  5/2010

OTHER PUBLICATIONS

Machine Translation of JP2010103606A.*
Field, G. Color and its reproduction, Pittsburgh: Graphics Arts Tech Foundation, 1988, ISBN 088362-088-X.
U.S. Appl. No. 61/106,172, filed Oct. 17, 2008, Kuo et al.

(Continued)

*Primary Examiner* — Richard Zhu
(74) *Attorney, Agent, or Firm* — Christopher J. White; William R. Zimmerli

(57) ABSTRACT

A method of providing calibration data for a printer includes printing a calibration target using the printer. The target includes a plurality of patch sets, each including a plurality of test patches, each patch having a respective color. Scanned patch data for one of the sets are received from a spot scanner. The scanned patch data values are compared to respective aims to determine a reproduction error value for the scanned patch set. A processor automatically determines which of the sets should be scanned next using the calculated reproduction error value. The process is repeated until all sets have been scanned, or until the reproduction error value is less than or equal to a selected threshold. Calibration data are automatically generated using the scanned patch data.

5 Claims, 8 Drawing Sheets

(56) References Cited

OTHER PUBLICATIONS

U.S. Appl. No. 12/642,883, filed Dec. 21, 2009, O'Leary et al.

* cited by examiner

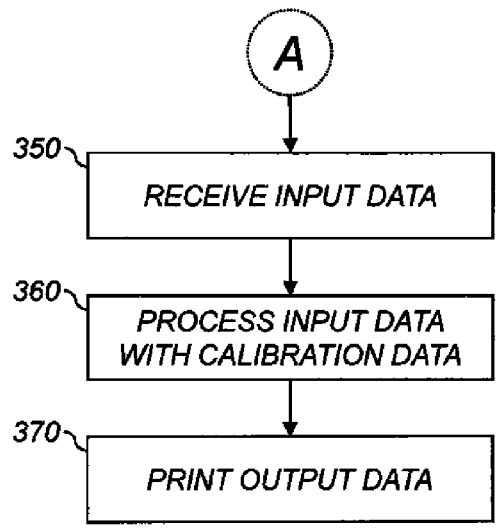
FIG. 3B
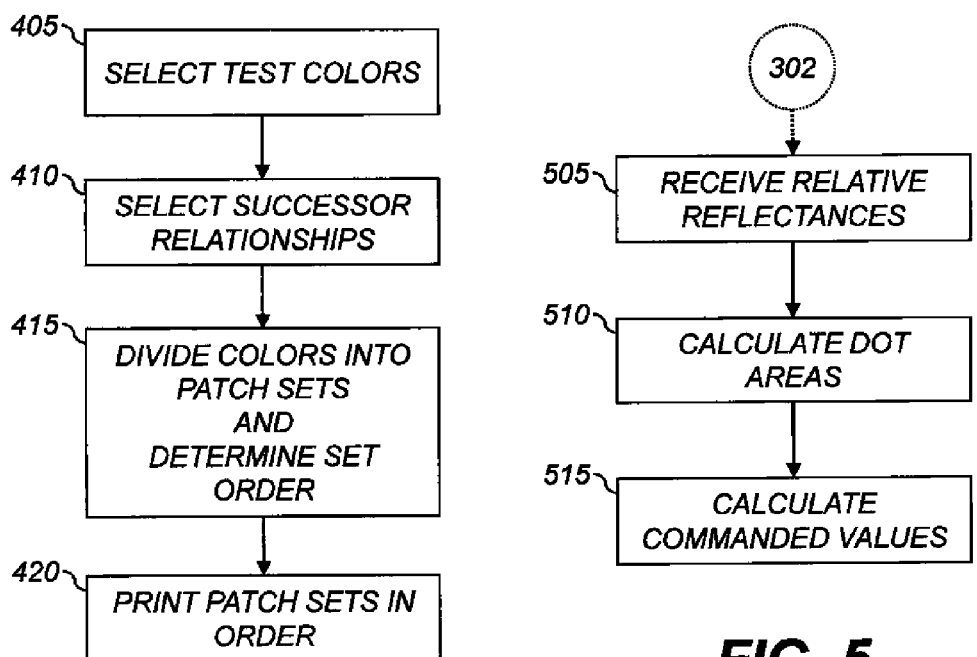
FIG. 4
FIG. 5

PROVIDING CALIBRATION DATA FOR PRINTER

CROSS-REFERENCE TO RELATED APPLICATIONS

Reference is made to commonly assigned, U.S. Patent Publication Application Publication No. 2012/0120428, entitled "Scanning Patches to Provide Printer Calibration Data," by Thomas A. Henderson, and US Patent Application Publication No. 2012/0133961, filed concurrently herewith, entitled "Producing Calibration Target for Printer," by Thomas A. Henderson, the disclosures of which are incorporated by reference herein.

FIELD OF THE INVENTION

This invention pertains to the field of printing and more particularly to color calibration of a printer.

BACKGROUND OF THE INVENTION

Variations in the operational parameters of a printer while printing can cause variations in color and tone reproduction between and within jobs. Printers are calibrated by printing test targets of known colors, measuring the colors reproduced by the printer, and comparing those measurements to the known colors to determine correction factors. Flatbed scanners can be used to scan printed targets. However, flatbed scanners are most often colorimetric instruments, not spectroradiometric instruments. That is, flatbed scanners represent each color as a match of three corresponding primaries. Spectroradiometers, by contrast, measure the full spectrum of light reflected from each patch, permitting much more accurate measurements and effective compensations. However, spectroradiometers are most often capable of measuring only one sample at a time; typical test targets include many samples. Spectroradiometer measurements are often taken by an operator, or robotically, one patch at a time, using an instrument such as an I1BASIC from X-RITE, INC. As used herein, a "spot scanner" is a scanner capable of measuring only one patch at a time. Spot scanners can be mounted on mechanical or robotic carriers to scan, e.g., full-page targets, but they still scan only one patch at any given instant of time.

U.S. Pat. No. 6,441,923 to Balasubramanian et al. describes generating a calibration target dynamically in response to selected printer variables. The whole target is measured and used for calibration. This scheme is, therefore, not optimized for use with spot scanners. It requires scanning many patches.

Commonly-assigned U.S. Pat. No. 7,271,935, issued Sep. 18, 2007 to Coons et al., describes a printer for printing color patches of a selected color patch set adjacent to printed images on a receiver medium. A patch set is selected based on the amount of space left on the receiver, measured in terms of the number of gaps between images remaining on the receiver medium. U.S. Pat. No. 7,123,384, issued Oct. 17, 2006 to Koifman, describes a dot-gain calibration target including a plurality of sets of patches, each set screened differently. For example, the different sets can have different pitches in lines per inch (lpi). Multiple strips are printed on a single target and scanned together. Although useful, these schemes do not assist the operator of a spot scanner.

U.S. Pat. No. 7,069,164, issued Jun. 27, 2007 to Viturro et al., describes calibrating inline sensors in a printer using a reference target containing rows and columns of patches. U.S. Pat. No. 6,567,170, issued May 20, 2003 to Tandon et al., describes an inline sensor for detecting color variations in printed test patches. The sensor includes a color digital camera to image the printed test patches, and one or more LEDs for illumination. Since this scheme uses R, G, B or other spectral bandpass filters, it cannot provide spectral information at the level of accuracy of a spot scanner. Moreover, neither of these schemes reduces workload for the operator of a spot scanner.

There is a need, therefore, for a method of providing calibration data for a printer that reduces operator workload while providing accurate results.

SUMMARY OF THE INVENTION

According to an aspect of the present invention, there is provided a method of providing calibration data for a printer, comprising:

printing a calibration target using the printer, the target including a plurality of patch sets, each including a plurality of test patches, each patch having a respective color;

receiving scanned patch data for one of the sets from a spot scanner;

comparing the scanned patch data values to respective aims to determine a reproduction error value for the scanned patch set;

using a processor to automatically determine which of the sets should be scanned next using the calculated reproduction error value;

if not all sets have been scanned, directing the scanning of the determined next set;

repeating the scanning through directing steps until all sets have been scanned, or until the reproduction error value is less than or equal to a selected threshold; and automatically generating the calibration data using the scanned patch data.

According to another aspect of the present invention, there is provided a method of providing calibration data for a printer, comprising:

printing a calibration target using the printer, the target including a plurality of patch sets, each including a plurality of test patches, each patch having a respective color;

receiving from a spot scanner scanned patch data for one of the sets;

comparing the scanned patch data values to respective aims to determine a plurality of reproduction error values, each corresponding to one or more of the patches in the scanned patch set;

using a processor to automatically determine which of the sets should be scanned next, if any, using the calculated reproduction error values;

if not all sets have been scanned, and there is a set to be scanned next, directing the scanning of the determined next set;

repeating the receiving through directing steps until all sets have been scanned, or until the reproduction error values are less than or equal to respective selected thresholds; and automatically generating the calibration data using the scanned patch data.

According to another aspect of the present invention, there is provided a method of providing calibration data for a printer, comprising:

printing a calibration target using the printer, the target including a master patch set and a plurality of subsidiary patch sets, each patch set including a plurality of test patches, each patch having a respective color;

receiving from a spot scanner master scanned patch data for the master patch set;

comparing the master scanned patch data values to respective aims to determine a plurality of master reproduction error values, each corresponding to one or more of the patches in the master patch set;

using a processor to automatically determine which of the subsidiary patch sets should be scanned, if any, using the calculated master reproduction error values;

if there is a subsidiary patch set to be scanned, directing the scanning of the determined subsidiary patch sets and receiving from the spot scanner respective scanned patch data corresponding to the determined subsidiary patch sets; and automatically generating the calibration data using the scanned patch data.

An advantage of this invention is that it reduces the time required to scan a calibration target when the printer is not significantly out of calibration. Various embodiments direct the scanning of only the patches required for calibration. Specific segments of the printer's color gamut can be scanned in more detail than others, as required to achieve high image quality.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 3A-3B are a flowchart and dataflow diagram of a method of providing calibration data for a printer according to an embodiment;

FIG. 4 is a flowchart of a method of making a calibration target for a printer;

FIG. 5 is a flowchart of a method of calculating CMYK values for a color (e.g., an aim color) according to an embodiment;

Figure 1:
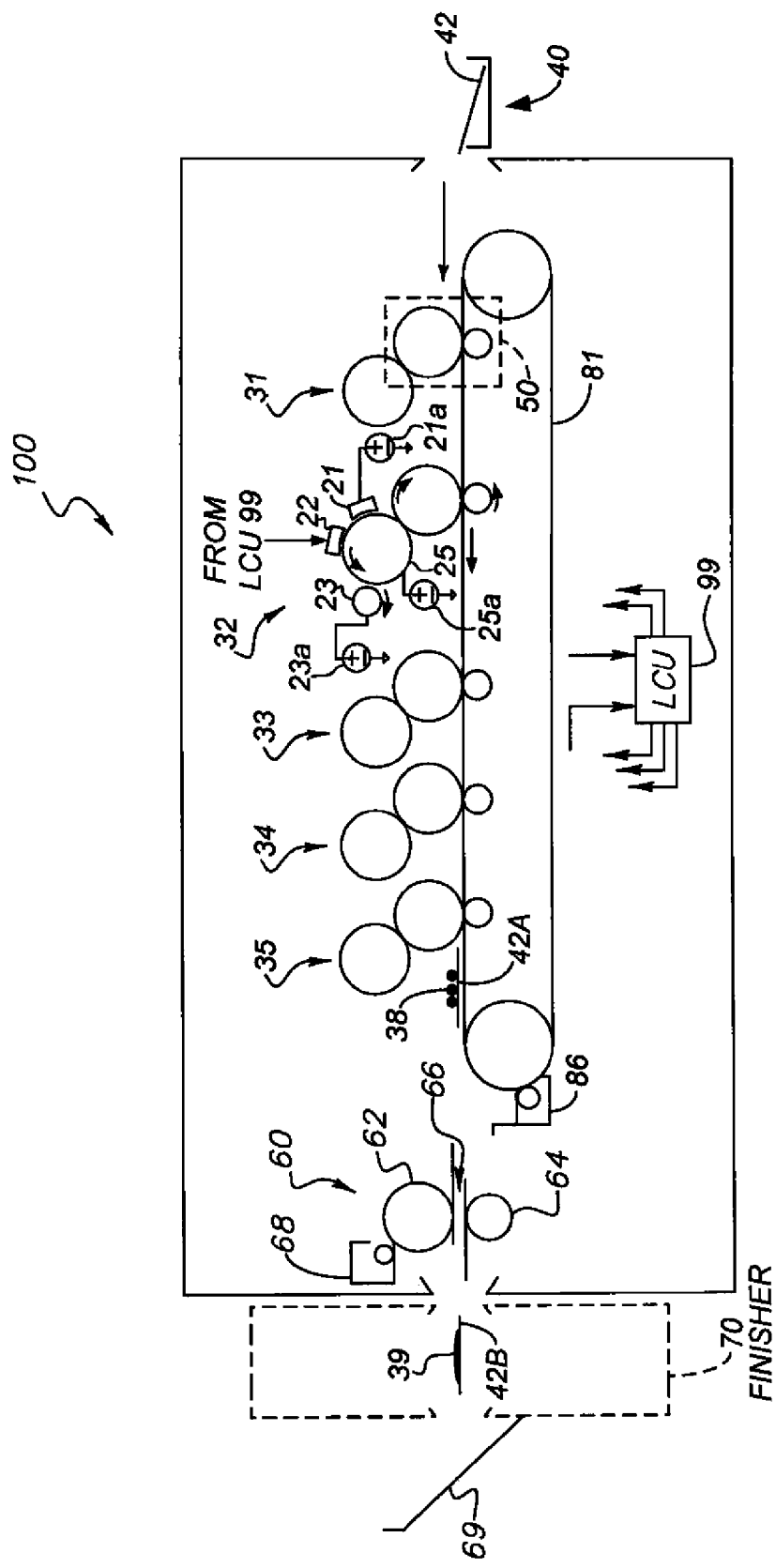
FIG. 1 is an elevational cross-section of an electrophotographic reproduction apparatus suitable for use with this invention.

The attached drawings are for purposes of illustration and are not necessarily to scale.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein, are selected from such systems, algorithms, components, and elements known in the art. Given the system as described according to the invention in the following, software not specifically shown, suggested, or described herein that is useful for implementation of the invention is conventional and within the ordinary skill in such arts.

The phrase, "digital image file", as used herein, refers to any digital image file, such as a digital still image or a digital video file.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Various types of printers can be calibrated as described herein. For example, continuous inkjet, drop-on-demand inkjet (as described in co-pending, commonly-assigned U.S. Ser. No. 12/642,883, the disclosure of which is incorporated herein by reference), thermal, electrophotographic, flexographic, and offset printers or presses can be calibrated as described herein. Electrophotography is described herein to provide an example of a printer which can be calibrated as described herein.

Electrophotography is a useful process for printing images on a receiver (or "imaging substrate"), such as a piece or sheet of paper or another planar medium, glass, fabric, metal, or other objects as will be described below. In this process, an electrostatic latent image is formed on a photoreceptor by uniformly charging the photoreceptor and then discharging selected areas of the uniform charge to yield an electrostatic charge pattern corresponding to the desired image (a "latent image").

After the latent image is formed, charged toner particles are brought into the vicinity of the photoreceptor and are attracted to the latent image to develop the latent image into a visible image. Note that the visible image may not be visible to the naked eye depending on the composition of the toner particles (e.g. clear toner).

After the latent image is developed into a visible image on the photoreceptor, a suitable receiver is brought into juxtaposition with the visible image. A suitable electric field is applied to transfer the toner particles of the visible image to the receiver to form the desired print image on the receiver. The imaging process is typically repeated many times with reusable photoreceptors.

The receiver is then removed from its operative association with the photoreceptor and subjected to heat or pressure to permanently fix ("fuse") the print image to the receiver. Plural print images, e.g. of separations of different colors, are overlaid on one receiver before fusing to form a multi-color print image on the receiver.

Electrophotographic (EP) printers typically transport the receiver past the photoreceptor to form the print image. The direction of travel of the receiver is referred to as the slow-scan, process, or in-track direction. This is typically the vertical (Y) direction of a portrait-oriented receiver. The direction perpendicular to the slow-scan direction is referred to as the fast-scan, cross-process, or cross-track direction, and is typically the horizontal (X) direction of a portrait-oriented receiver. "Scan" does not imply that any components are moving or scanning across the receiver; the terminology is conventional in the art.

The electrophotographic process can be embodied in devices including printers, copiers, scanners, and facsimiles, and analog or digital devices, all of which are referred to herein as "printers." Various aspects of the present invention are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, paper type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with the present invention, e.g. the NEXPRESS 2100 printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

FIG. 1 is an elevational cross-section showing portions of a typical electrophotographic printer 100 useful with the present invention. Printer 100 is adapted to produce images, such as single-color (monochrome), CMYK, or pentachrome (five-color) images, on a receiver (multicolor images are also known as "multi-component" images). Images can include text, graphics, photos, and other types of visual content. One embodiment involves printing using an electrophotographic print engine having five sets of single-color image-producing or -printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, also known as electrophotographic imaging subsystems. Each printing module produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each receiver, during a single pass through the five modules, can have transferred in registration thereto up to five single-color toner images to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an embodiment, printing module 31 forms black (K) print images, 32 forms yellow (Y) print images, 33 forms magenta (M) print images, and 34 forms cyan (C) print images.

Printing module 35 can form a red, blue, green, or other fifth print image, including an image formed from a clear toner (i.e. one lacking pigment). The four subtractive primary colors, cyan, magenta, yellow, and black, can be combined in various combinations of subsets thereof to form a representative spectrum of colors. The color gamut or range of a printer is dependent upon the materials used and process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g. metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 35. Print image 38 on receiver 42A includes unfused toner particles.

Subsequent to transfer of the respective print images, overlaid in registration, one from each of the respective printing modules 31, 32, 33, 34, 35, receiver 42A is advanced to a fuser 60, i.e. a fusing or fixing assembly, to fuse print image 38 to receiver 42A. Transport web 81 transports the print-image-carrying receivers to fuser 60, which fixes the toner particles to the respective receivers by the application of heat and pressure. The receivers are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed with the present invention. For example, solvent fixing uses solvents to soften the toner particles so they bond with the receiver. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver.

The receivers (e.g. receiver 42B) carrying the fused image (e.g., fused image 39) are transported in a series from the fuser 60 along a path either to a remote output tray 69, or back to printing modules 31, 32, 33, 34, 35 to create an image on the backside of the receiver, i.e. to form a duplex print. Receivers can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various paper-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Each printing module 31, 32, 33, 34, 35 includes various components. For clarity, these are only shown in printing module 32.

Photoreceptor 25 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 25 is part of, or disposed over, the surface of an imaging member, which can be a plate, drum, or belt. Photoreceptors can include a homogeneous layer of a single material such as vitreous selenium or a composite layer containing a photoconductor and another material. Photoreceptors can also contain multiple layers.

Around photoreceptor 25 are arranged, ordered by the direction of rotation of photoreceptor 25, charger 21, exposure subsystem 22, and toning station 23. Transfer subsystem 50 transfers the visible image from photoreceptor 25 after toning station 23 to a receiver moving through transfer subsystem 50.

As described above, charger 21 produces a uniform electrostatic charge on photoreceptor 25 or its surface. In an embodiment, charger 21 is a corona charger including a grid between the corona wires (not shown) and photoreceptor 25. Voltage source 21a applies a voltage to the grid to control charging of photoreceptor 25.

Exposure subsystem 22 selectively image-wise discharges photoreceptor 25 to produce a latent image. In embodiments using laser devices, a rotating polygon (not shown) is used to scan one or more laser beam(s) across the photoreceptor in the fast-scan direction. One dot site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each dot site in the row during that line exposure time.

As used herein, an "engine pixel" is the smallest addressable unit on photoreceptor 25 or receiver 42 (FIG. 1) which the light source (e.g., laser or LED) can expose with a selected exposure different from the exposure of another engine pixel. Engine pixels can overlap, e.g., to increase addressability in the slow-scan direction (S). Each engine pixel has a corresponding engine pixel location, and the exposure applied to the engine pixel location is described by an engine pixel level.

Toning station 23 (also called a development station in the art) applies toner to the photoreceptor to develop the latent image into a visible image. Toner can be applied to either the charged or discharged parts of the latent image. Toning station 23 includes a developer supply and a toning member. Developer is provided to the toning member by the supply, which can include a supply roller, auger, or belt. Toner is transferred by electrostatic forces from the toning member to photoreceptor 25. These forces can include Coulombic forces between charged toner particles and the charged electrostatic latent image, and Lorentz forces on the charged toner particles due to the electric field produced by bias voltages on the components of the system.

The toning station 23 can include a rotating or stationary toning shell for transporting toner, and optionally a rotating or stationary magnetic core inside the toning shell for drawing developer to the toning shell. One-component or two-component developers can be used with the toning station 23. The magnetic core can include one magnet or a plurality of magnets, and, if rotating, can rotate at a speed or in a direction the same as, or different from, the speed or direction of the toning shell. The magnetic core preferably provides a magnetic field of varying magnitude and direction around the outer circumference of the toning shell. Further details of magnetic cores can be found in U.S. Pat. No. 7,120,379 to Eck et al., issued Oct. 10, 2006, and in U.S. Publication No. 2002/0168200 to Stelter et al., published Nov. 14, 2002, the disclosures of which are incorporated herein by reference.

In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. Exposure subsystem 22 can include one or more LEDs, or a laser and a raster optical scanner (ROS). All of these parameters can be changed to adjust the operation of printer 100.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 2:
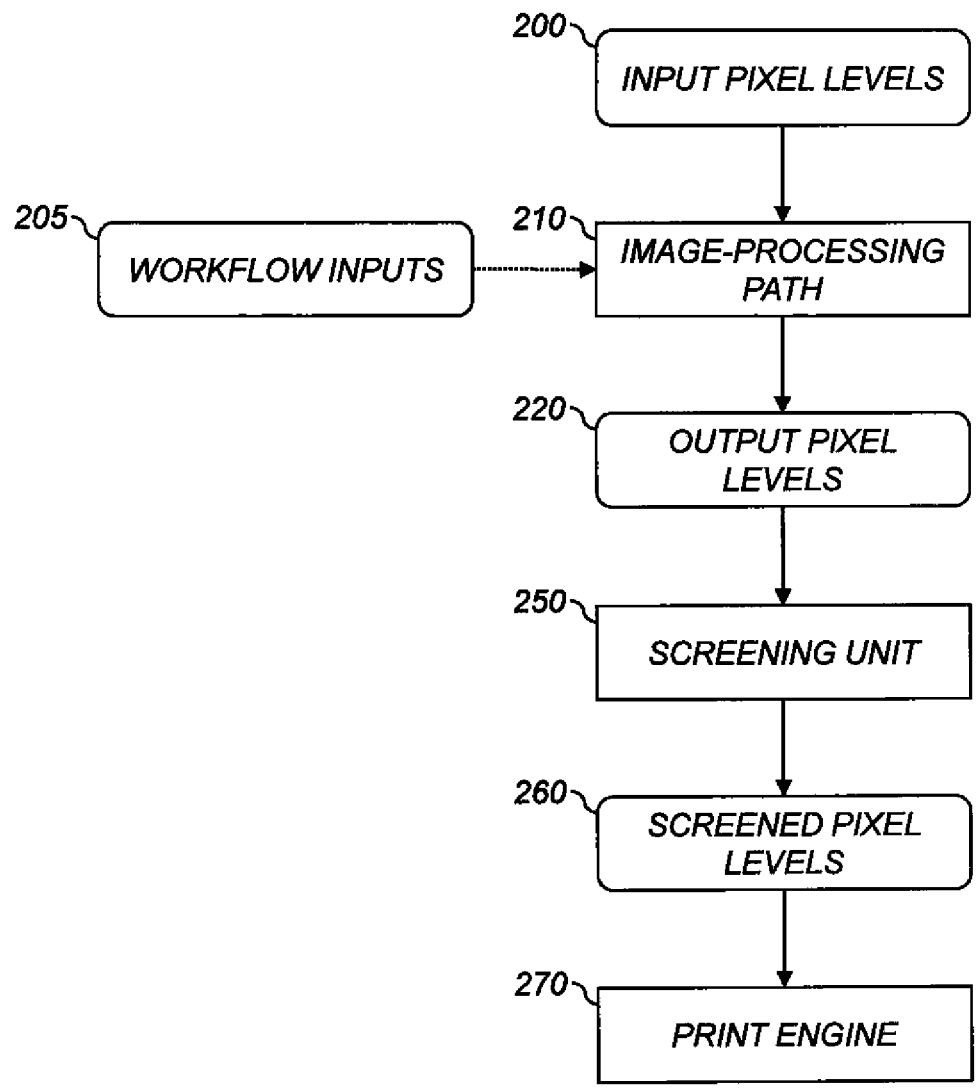
FIG. 2 shows a data-processing path useful with the present invention.

FIG. 2 shows a data-processing path useful with the present invention, and defines several terms used herein. Printer 100 (FIG. 1) or corresponding electronics (e.g. the DFE or RIP), described herein, operate this datapath to produce image data corresponding to exposure to be applied to a photoreceptor, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 . . . 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. Output pixel level 220 can be linear or non-linear with respect to exposure, L*, or other factors known in the art.

Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi≠oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multilevel halftone processing, and can include a screening memory or dither bitmaps. Screened pixel levels 260 are at the bit depth required by print engine 270.

Print engine 270 represents the subsystems in printer 100 that apply an amount of toner corresponding to the screened pixel levels to a receiver 42 (FIG. 1) at the respective screened pixel locations. Examples of these subsystems are described above with reference to FIGS. 1-3. The screened pixel levels and locations can be the engine pixel levels and locations, or additional processing can be performed to transform the screened pixel levels and locations into the engine pixel levels and locations.

Figure 3A:
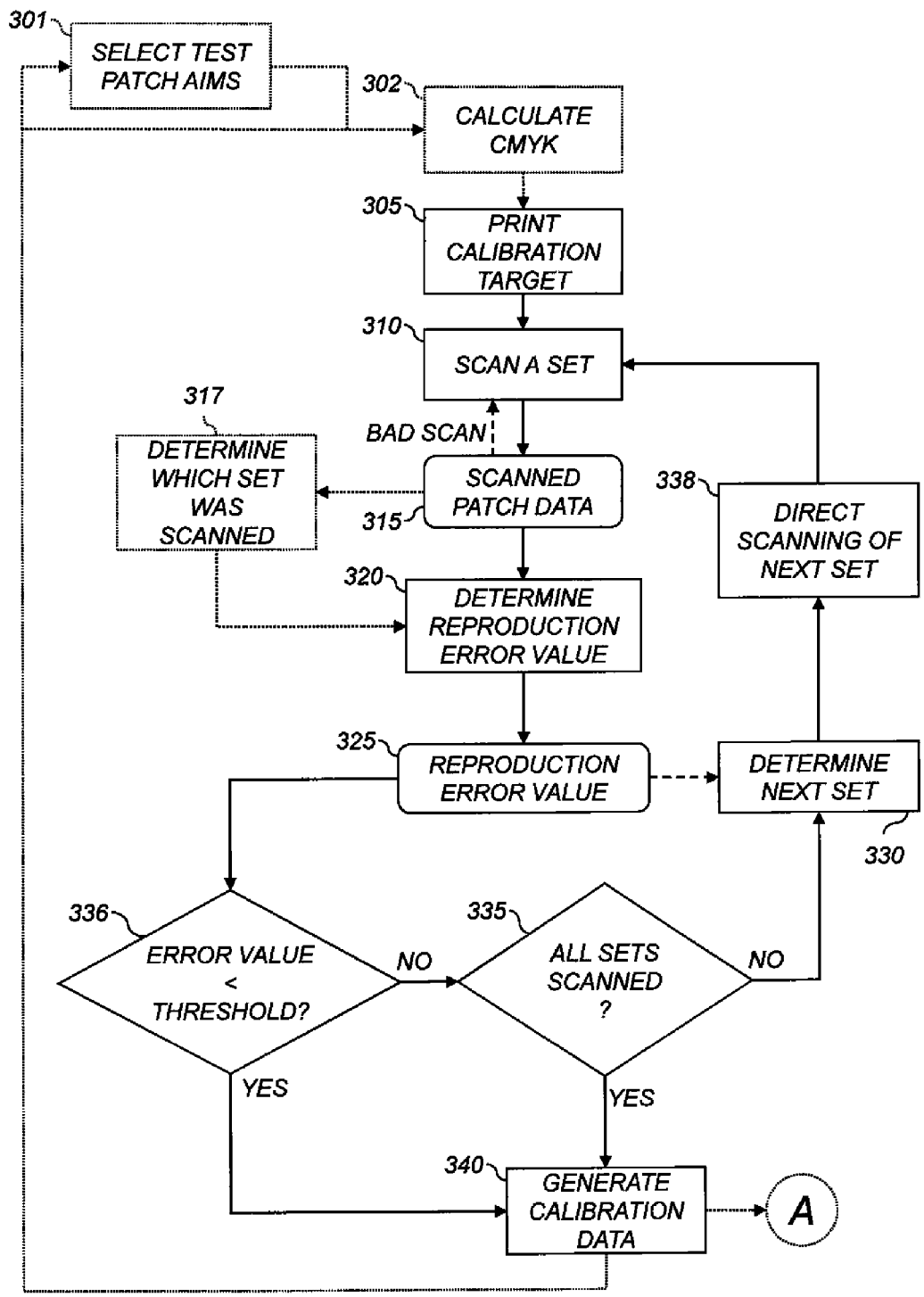

FIGS. 3A-3B are a flowchart and dataflow diagram of a method of providing calibration data for a printer according to an embodiment. Rectangles indicate steps and rounded rectangles indicate data items. Referring to FIG. 3A, processing begins with step 305, or, optionally, with steps 301 or 302 (discussed below).

In step 305, the calibration target is printed using the printer. The target includes a plurality of patch sets, and each patch set includes a plurality of test patches. Each patch has a respective aim color, which can be a neutral (i.e., can have any CIELAB coordinates reproducible by the printer), and a corresponding reproduced color. Each aim color represents the desired visual appearance of the corresponding test color under specified conditions (e.g., D50 source, indoor, background (surround) illumination 801x). Measurements are taken as described below to determine the reproduced colors of the test patches. On an ideal printer, the reproduced colors are identical to the aim colors. Various embodiments described herein improve the quality of the match of the reproduced colors to the aim colors by adjusting operation of the printer or data-processing system providing data to the printer. Step 305 is followed by step 310.

In step 310, scanned patch data representing the colors of the test patches for one of the sets are received from a spot scanner. The data can be received via a scanner-control computer. An operator or a robot can scan one of the sets with a spot scanner to provide the scanned patch data. Step 310 produces scanned patch data 315. Scanned patch data 315 are provided to step 320 and optional step 317. As used herein, "measured" and "scanned" are synonymous when referring to the scanning of the test patches to provide scanned patch data, whether scanned by an operator or otherwise.

In optional step 317, a processor is used to automatically determine which set was scanned. This can be performed by selecting patches providing high-signal-to-noise-ratio measurements (e.g., those with densities above a threshold). The positions within the patch set of the selected patches (e.g., the first, third, and seventh of eight patches) are compared to the expected positions of selected patches in each patch set, and the closest match is determined to be the set that was scanned. Alternatively, the CIELAB RMS $\Delta E^*$ between the measured patches and the patches in a set can be computed for each set. The set that has the lowest RMS $\Delta E^*$ to the measurements is determined to be the set that was measured. Further details of various embodiments of this process are found in U.S. patent application Ser. No. 12/944,960 by Henderson, referenced above. Step 317 is followed by step 320.

In various embodiments, the processor checks whether the number of patches scanned is equal to the number expected. The processor can also check other parameters to determine whether a full set of scanned patch data was collected. If a full set was not collected, the processor directs that the missing patches be scanned, or all patches be rescanned, e.g., by prompting the operator to scan the missing patches; the next step is step 310. This is shown in FIG. 3A by the arrow labeled "bad scan."

In step 320, the scanned patch data values are compared to respective aims to determine a reproduction error value 325 for the scanned patch set. This step can be performed by a processor. In various embodiments, reproduction error value 325 indicates to what extent the printed (reproduced) test patches that were scanned have colors differing from their respective aims. In other embodiments, reproduction error value 325 indicates the estimated errors in a typical image printed using calibration data calculated from the presently-measured test patches. Using the calibration data, the printer can print any image (or other content), but the accuracy of any given color in that image is a function of its proximity to a color actually measured during the calibration process. In these embodiments, reproduction error value 325 represents the performance of the printer reproducing images using the calibration data available from the test patches scanned. This will be discussed in more detail below.

In the former embodiments described above, reproduction error value 325 indicates to what extent the reproduction of the test patches does not match the specification provided for the calibration target. Reproduction error value 325 can represent or measure deviations of the scanned patch data values from the aims or from linearity or another desired curve shape (e.g., dot gain curve) of the scanned values. A plurality of reproduction error values can also be computed for different (possibly overlapping) subsets of the test patches in the scanned patch set. For example, respective reproduction error values can be computed for each of the six 60° CIELAB hue sectors, starting from 0°. Step 320 produces reproduction error value 325, which is provided to decision step 336 and step 330.

Reproduction error value 325 can be expressed in CIELAB delta values (e.g., $\Delta E^*$), CIELUV deltas, hue-angle differences, or other color-difference units, and can include one value, multiple values, or a combination of values made by averaging, taking the RMS average, taking the maximum, taking the minimum, taking the median, or finding the standard deviation. In an embodiment, reproduction error value 325 is the CIELAB RMS $\Delta E^*$ between the patches in the set and their respective aims.

In the latter embodiments described above, the processor includes a model, which can be determined at printer manufacturing time and programmed into the processor, of how accurate reproduced colors in the printer's color gamut are. This model takes as input the aims and reproduced values of one or more test patches. For example, six test patches can be measured with aims equally spaced in $h^*$, $L^*=50$, $C^*=30$. From the six aim CIELAB values and the six corresponding measured CIELAB values, using the model, the processor can estimate the reproduced CIELAB values for a given aim (e.g., $L^*=75$, $C^*=20$, $h^*=15$). The processor can also, or alternatively, estimate an error envelope in CIELAB space in which the reproduction of a given aim is likely to occur, e.g., with 95% confidence. Continuing the example above, the processor can determine that the error envelope is $L^*=75\pm5$, $C^*=22\pm3$, $h^*=15.5\pm0.5$.

In these embodiments, reproduction error value 325 can represent the estimated or predicted CIELAB delta between one or more aim colors (which can include measured test patches or not), or a combination (e.g., RMS or mean) of such deltas. Other options are described above. Also, or alternatively, reproduction error value 325 can represent the size of the respective estimated or predicted error envelope(s) for one or more aim colors. In one example, reproduction error value 325 is the mean of the percentage gamut volume of each error envelope with respect to the printer's gamut volume.

Sets are scanned until all sets have been scanned, or until reproduction error value 325 is less than or equal to a selected threshold. That is, the measuring process stops if or when the measured data are close enough to the aims, or there are no more data. Specifically, decision step 336 decides whether calculated reproduction error value 325 is less than or equal to a selected threshold. If so, the data are good enough to meet the user's specifications, e.g., for color accuracy of prints, so no more sets need to be scanned. The next step is therefore step 340. However, when reproduction error value 325 is not below the threshold, the next step is decision step 335. Decision step 335 decides whether all sets have been scanned. If not, there are more sets to scan, so the next step is step 330. If so, there are no more sets, so the next step is step 340, and calibration data will be generated based on the data available, even if those data do not provide reproduction error values 325 as close to the threshold as desired (i.e., do not provide as accurate a calibration as desired). If the measured data are not sufficient to provide a calibration of the quality desired (measured, e.g., in terms of predicted reproduced CIELAB $\Delta E^*$), steps 301 or 302, discussed below, can be used to print a new target and re-commence the calibration process to obtain a more accurate result.

In the former embodiments described above, reproduction error value 325 represents the error for the measured patches. The measurement process stops if the patches measured are sufficiently accurate. No additional patches are measured. In the latter embodiments, reproduction error value 325 represents the predicted error for one or more colors. The measurement process continues measuring patches, and consequently improving the accuracy of the estimates and reproductions, until the predicted error is sufficiently small. Measuring more patches provides more data to make a better estimate and better calibration data. Patches can be measured until the processor predicts that the viewer of a printed image will not see any difference between the reproduction and the aims (e.g., CIELAB $\Delta E^*$<1.0 for colors or <0.5 for neutrals).

In step 330, a processor is used to automatically determine, based on calculated reproduction error value 325, which of the sets should be scanned next (if any). For example, if the first set scanned contains colors from a variety of hue angles, and the reproduction error value(s) indicate that blue colors (i.e., colors in a blue hue sector, e.g., CIELAB h*=210°-285°) are farther from their aims (i.e., have greater reproduction error) than red colors (e.g., 20°-40°), the processor determines that a set with more blue colors should be scanned next, taking preference over a set with more red colors. This permits faster convergence to correct calibration data for the largest errors, and reduces the probability that errors in blue colors will also cause error in red colors. Step 330 is followed by step 338.

In step 338, the processor directs the scanning of the determined next set. That is, the processor issues a command which will result in the determined next set's being scanned, and its corresponding scanned patch data provided to the processor. For example, the processor can direct an operator to scan the determined next set by displaying identification of the next set on a display. The processor can also direct a robot or other machine to scan the next set by sending a command, e.g., over a fieldbus, RSLINX, or hard-wired (e.g. 0-5V or 0-20 mA) connection. Step 338 is followed by step 310. In this way the scanning through directing steps are repeated until the scanning is complete, as described above.

In an embodiment, the test set includes replicates. That is, a first and a second test patch in respective, different patch sets have the same aim colors, within a selected tolerance. Alternatively, two patches in the same patch set can have the same aim color. The additional data can increase the signal-to-noise ratio of the measured patches, and provide an opportunity to correct for any spatial nonuniformity of the printed target.

In step 340, the calibration data are automatically generated using the scanned patch data. In various embodiments, the calibration data are also generated using the respective aim colors for the scanned patches. In one embodiment, the test patches include patches for the subtractive primary colors (cyan, magenta, yellow, and black), and for any other color channel present in the printer (e.g., red or light black). For each color channel (CMYK+others), test patches are provided to cover the range of aim densities intended to be printed (e.g., 0% (a white patch, possibly using a single patch for all channels) to 100% (maximum laydown of the colorant in a single channel)). The patches are measured, and a single characterization curve (or table) is formed for each channel by interpolating or fitting the curve of (aim density, measured density) points. The characterization curve is then inverted to produce a curve that transforms desired density on the paper into the aim density input to the printer to produce that desired density. In an embodiment, the inverted characterization curve is expressed in terms of input pixel levels 200 (FIG. 2) to image-processing path 210 (FIG. 2), and each successive input pixel level 200 represents a constant increase in reproduced CIELAB L*. In another embodiment, the inverted characterization curve approximates a typical 20% dot-gain calibration curve. Color balance can also be adjusted as known in the art. Additional embodiments useful with this method are described in commonly-assigned U.S. Pat. No. 7,548,343 to Ng et al., issued Jun. 16, 2009, the disclosure of which is incorporated herein by reference.

In some embodiments, step 340 is followed by step 302; that is, the calibration process is repeated, using the new calibration data to calculate the CMYK values in step 302, described below. Alternatively, which patches to print can be selected based on the calibration data, and the process repeated from step 301, described below. The process can be repeated until the color difference between the aim colors and the reproduced colors is within a selected tolerance.

In various embodiments, processing begins with step 301. In step 301, an aim color (described above) for each test patch is selected. The aim colors can be expressed in XYZ, CIELAB, HSV, or other known color systems. Step 301 is followed by step 302.

In step 302, CMYK values are calculated for each aim color. These can be calculated as described below with reference to FIG. 5, but using either the most recent calibration data for the printer (e.g., if following the flowchart from step 340 back to step 302 to repeat), or initial calibration data selected before beginning the process shown.

Referring to FIG. 3B, in an embodiment, the printer is operated once the calibration data are generated. In step 350, input data for a job to be printed are received. Step 350 is followed by step 360.

In step 360, the input data are automatically processed with the calibration data generated in step 340 to produce output data. This processing can be performed using a processor (e.g., in image-processing path 210 shown in FIG. 2), as discussed above. In one embodiment, the calibration data can include one or more transformation table(s) mapping input data to output data, and the processor can look up each input data value in the transformation table(s) to retrieve the output data. The table(s) can include a sampling of the possible input data values, and interpolation between the values in the table(s) can be used to produce output data values for input data values between sampling points. In another embodiment, step 340 can generate calibration data including an ICC profile, and step 360 can process the input data with the generated ICC profile to provide the output data. Step 360 is followed by step 370.

In step 370, the output data are printed using the printer. In this way an accurate representation of the input data is produced on the printer, and color errors and other errors in printing are compensated for by the calibration data. This provides improved image quality compared to printing without calibration.

FIG. 4 is a flowchart of a method of making a calibration target for a printer. The printer has a color gamut, which can be expressed in terms of gamut volume or gamut boundary. Processing begins with step 405.

The following terms are used throughout this description. Test patches are to be measured; each test patch is a printed representation (possibly inaccurate) of a particular test color. The test set is the group of all test colors. Test colors (and thus test patches) can have other patches as successors; each patch (predecessor or parent) should be measured before any of its successors (or children). The directed acyclic graph (DAG) of all the test colors, with predecessors linked to successors, is called the order DAG. The patch order is an order in which to measure all the patches so that no successor is measured before one of its predecessors. For convenience of scanning, test patches are grouped into patch sets. The set order is an order in which to measure the sets so that no successor test patch is measured before one of its predecessors. This is explained in more detail below.

In step 405, a plurality of test colors in the gamut are selected. This plurality is referred to herein as a "test set." Test colors on the boundary of the gamut are considered to be in the gamut. The test colors can include neutrals, e.g., patches with $C^* < 1.0$ or $C^* < 0.5$ ("color" does not require $C^* > 0.5$ or any other criterion). Step 405 is followed by step 410.

In step 410, a plurality of successor relationships are selected. Each successor relationship indicates one of the test colors is a successor of another one of the test colors. The successor(s) of each test color are to be measured with or after that test color. The successor relationships form a directed acyclic forest; all nodes of that forest with no in-links can be measured in any order and so are considered to be children of a start node, as discussed further below. The directed acyclic graph (DAG) rooted at the start node is hereinafter referred to as the order DAG. Step 410 is followed by step 415.

In one example of successor relationships, the test set includes six test colors evenly spaced in CIELAB $h^*$ from $h^* = 0°$ (red) to 360°, with $C^* = 30$ and $L^* = 30$. The test set also includes, for each of the six, four patches offset in $a^*$ by $\pm 5$ and offset in $b^*$ by $\pm 5$, respectively. Each of those four patches is a successor of the patch around which it is centered. For example, the patch with $(L^*, C^*, h^*) = (30, 30, 0)$, so $(L^*, a^*, b^*) = (30, 30, 0)$ has as its successors $(L^*, a^*, b^*) = (30, 35, 0)$, $(30, 25, 0)$, $(30, 30, 5)$, and $(30, 30, -5)$. The six patches around the hue range provide coarse calibration information about the overall performance of the printer, and the four patches arrayed around each coarse-calibration patch provide fine calibration information about the performance of the printer in a specific hue range. Consequently, each fine-calibration patch should be measured only after its corresponding coarse-calibration patch has been measured to determine whether it is necessary to perform fine calibration. This saves time in calibration, since patches that do not need to be measured are not measured.

In step 415, a processor is used to automatically divide the test colors into a plurality of patch sets, each including one or more test colors that are to be measured together. Continuing the example above, the six coarse-calibration colors form one patch set, and each of the six groups of four fine-calibration patches forms another patch set. Step 415 is followed by step 420.

Figure 8:
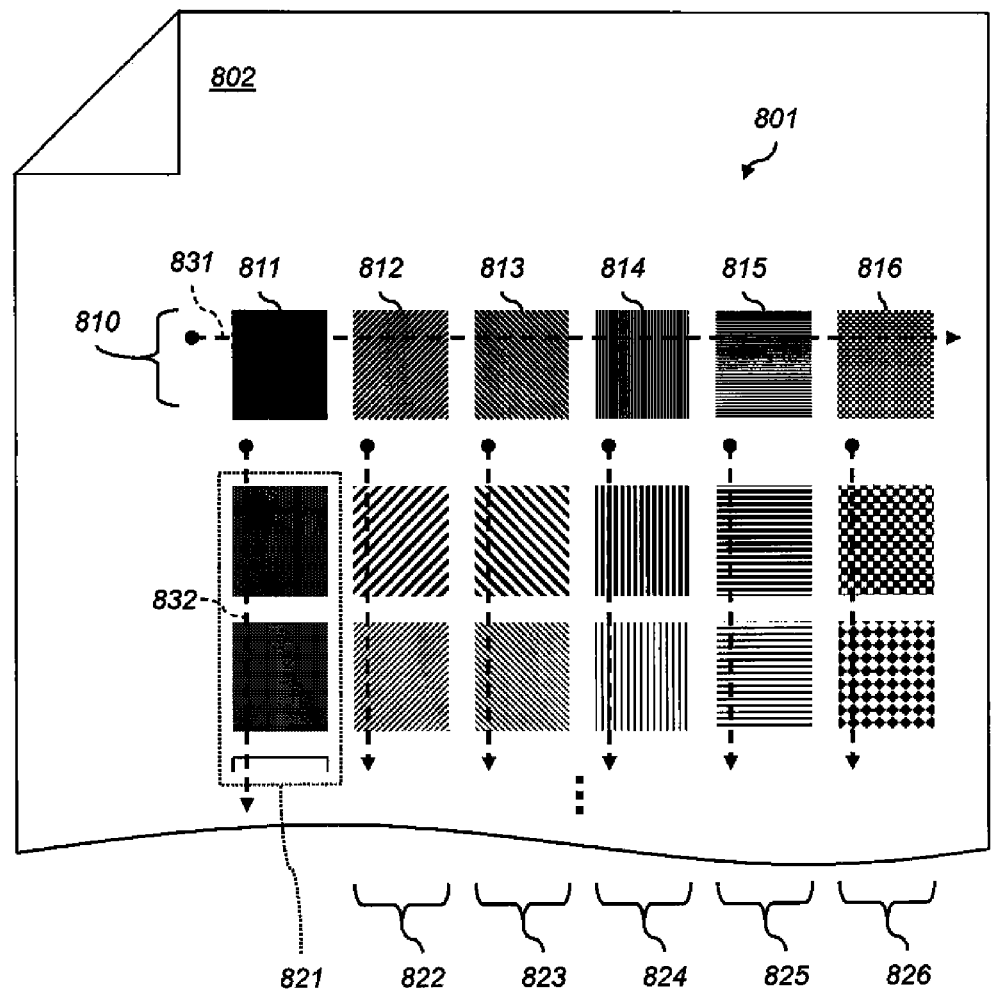
FIG. 8 is a representation of a test target.

Continuing this example, the test patches on such a calibration target are arranged spatially into a master patch set and a plurality of subsidiary patch sets. The master patch set includes the six coarse-calibration colors, and each of the six subsidiary patch sets includes the four fine-calibration patches corresponding to one of the coarse-calibration patches. The test patches in each subsidiary patch set therefore have a selected color relationship to one of the patches in the master patch set. In an embodiment, the selected color relationship indicates that two related patches have a CIELAB $\Delta E^*$ less than a selected threshold between each other. That is, each patch in a subsidiary patch set is spaced apart from the corresponding patch in the master patch set by less than the selected threshold (e.g., 5.1). An example of such a test pattern is shown in FIG. 8.

Also in step 415, a set order of the patch sets is determined. Each patch set has a position in the set order prior to the position of any other patch set containing successors of the test colors in that patch set. Successors to test colors can be in the same patch set as those test colors, or in following sets in the set order. In an embodiment, the set order can be determined by traversing the order DAG (directed acyclic graph rooted at the start node, as discussed above), and numbering the nodes in postorder. For a DAG where links point from predecessors to successors, the patches are measured in descending order of the postorder traversal indices (parents are measured before children in the order DAG, and the start node has the highest postorder traversal index).

The two parts of step 415, dividing the colors into sets and determining the order of those sets, can be performed in either order, or together. In one embodiment, a patch order is first determined by the processor, e.g., by depth-first search (DFS) on the order DAG, as defined above. Each patch comes in the patch order before any of its successors. The patch sets are then defined by dividing the test set into a selected number of patch sets having approximately equal numbers of patches, each patch set containing test patches adjacent in the patch order. In other embodiments, patch sets are selected from the patch order by grouping patches of similar hue, saturation, or value, each set being given a position in the set order prior to the position of any other patch set containing successors of the test colors in that patch set. In another embodiment, the patches are assigned to patch sets while the order DAG is traversed. Since successors are processed first, any leaf node in the order DAG can be added to a patch set from last-measured to first-measured by grouping patches in subtrees or by the number of patches in each set. The traversal can also track the number of nodes in a subtree and assign subtrees to patch sets when that number reaches a certain point.

In step 420, a printer is used to print the patch sets on a receiver in the determined set order to form the calibration target. Color patches corresponding to the test colors in each patch set are printed adjacent to each other on the receiver, so that an entire set can be readily and quickly scanned. By "adjacent" in this paragraph, it is meant that each patch in a patch set is spatially proximate on the face of the receiver to at least one other patch in that patch set. Patch sets can be printed interleaved (e.g., one set being a row and the other a column intersecting with the row) or spatially separate, but each patch set on its own has adjacent patches. Adjacency can be horizontal, vertical, diagonal, or any direction. Patches can be printed with any size and with any layout meeting the constraints described in this paragraph, according to the requirements of the measurement device, the printer, and the receiver. For example, patch sets printed on 35 mm film (e.g., by optical exposure) can be single columns running the length of the film, and patch sets printed on A3 paper can be grids of patches arranged in rows and columns.

Referring back to FIG. 3A, multiple reproduction error values 325 and corresponding thresholds can be calculated and used. Continuing the example above, the coarse-calibration patch set having six patches evenly spaced in $h^*$ is the master patch set. The six fine-calibration patch sets, each having four patches close to one of the patches in the master patch set, are subsidiary patch sets. A separate threshold can be used for each of the six reproduction error values corresponding to the six patches in the master patch set. In step 336, each of the reproduction error values can be compared to the respective threshold. Some of the patches can have error values below their thresholds, and some above. If the subsidiary sets for all master patches with error values above their thresholds have already been measured, the overall error value is considered to be less than the threshold, since no further measurements need to be taken. The next step is therefore step 340. That is, when the sets include master and subsidiary sets, only subsidiary sets corresponding to master patches or sets with error values exceeding their thresholds are scanned.

Specifically, in various embodiments, a method of providing calibration data for a printer includes printing a calibration target using the printer, as described above. Scanned patch data for one of the sets are received from a spot scanner. The scanned patch data values are compared to respective aims to determine a plurality of reproduction error values, each corresponding to one or more of the patches in the scanned patch set. In the example discussed above, the master patch set is scanned, and six reproduction error values are produced, each corresponding to one of the six patches in the master patch set. Reproduction error values can also be calculated using multiple patches. For example, replicates (same-color) patches can be present in a patch set to reduce the effects of spatial non-uniformity on the calibration, and a single reproduction error value can be calculated for all replicated patches. The processor is then used to automatically determine which of the sets should be scanned next, if any, using the calculated reproduction error values. For example, the processor can select the next un-scanned subsidiary patch set corresponding to a patch in the scanned master patch set having a reproduction error value above its threshold. If not all sets have been scanned, and there is a set to be scanned next, the processor directs the scanning of the determined next set. If the processor determines that no set needs to be scanned next, e.g., because all reproduction error values are less than or equal to their thresholds, no set is directed to be scanned. The receiving through directing steps are repeated until all sets have been scanned, or until one or more selected values of the reproduction error values are less than or equal to respective selected thresholds. That is, not all sets are necessarily scanned. Calibration data are automatically generated using the scanned patch data, as described above.

Figure 10:
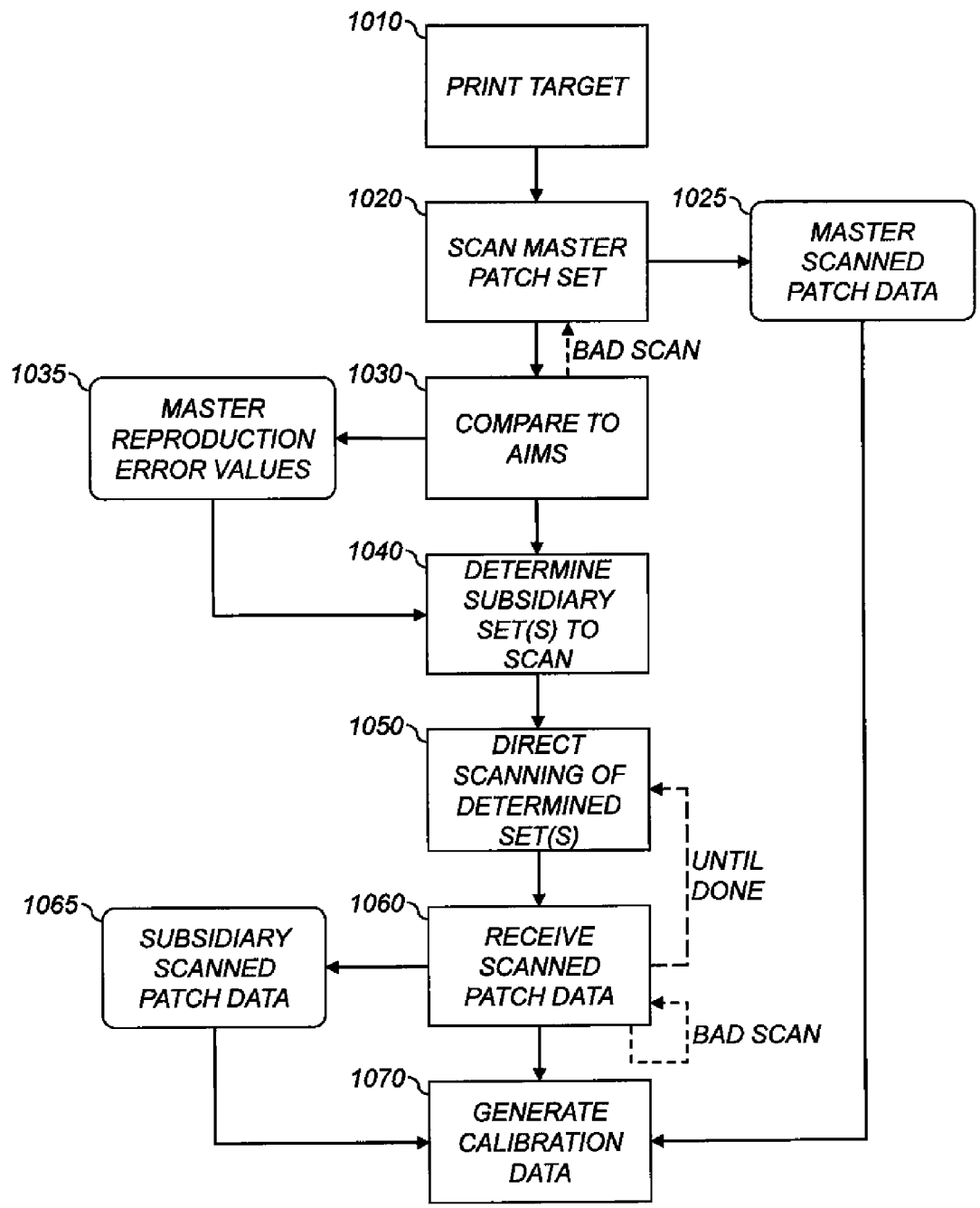
FIG. 10 is a flowchart of a method of providing calibration data for a printer according to an embodiment.

Referring to FIG. 10, in another embodiment of a method of providing calibration data for a printer, a calibration target is printed using the printer (step 1010). The target includes a master patch set and a plurality of subsidiary patch sets, as described above. Master scanned patch data 1025 are received from a spot scanner for the master patch set (step 1020). The master scanned patch data 1025 are compared to respective aims (step 1030) to determine a plurality of master reproduction error values 1035, each corresponding to one or more of the patches in the master patch set.

The processor automatically determines (step 1040) which of the subsidiary patch sets should be scanned, if any, using the calculated master reproduction error values 1035. For example, as discussed above, subsidiary patch sets in hue sectors (or lightness or saturation regions) exhibiting error can be scanned, and subsidiary patch sets in other sectors can be skipped. If there is a subsidiary patch set to be scanned, the scanning of the determined subsidiary patch sets is directed (step 1050), and respective subsidiary scanned patch data 1065 are received from the spot scanner corresponding to the determined subsidiary patch sets (step 1060).

In an embodiment, the processor directs the scanning of one set at a time and receives data for that set before directing the scanning of the next set, indicated by the dashed arrow labeled "until done" from step 1060 to step 1050. In other embodiments, the scanning of more than one set is directed, and data for the directed sets is received in a selected order, e.g., the order directed or a different order. The calibration data are then automatically generated (step 1070) using the master scanned patch data 1025 and subsidiary scanned patch data 1065.

As discussed above with reference to FIG. 3A, if the number of patches scanned is not equal to the number expected, the processor directs that the missing patches be scanned, or all patches be rescanned. This is shown by the arrows labeled "bad scan" from step 1030 to step 1020, and from step 1060 to itself. The "bad scan" arrows on FIGS. 3 and 10 are examples; bad scans can be detected at other times and in other ways. For example, step 1030 can determine whether the patches are close enough to the aims to count as a good scan. If the aims are patches in red, green, and blue hue sectors, and the scanned patch data are in cyan, magenta, and yellow hue sectors, the processor can determine that the scan was bad, since it is highly unlikely that the printer would be so far out of calibration that RGB would print as CMY. In various embodiments, the processor can receive an override signal to proceed even if it determines that a bad scan was received.

FIG. 5 is a flowchart of a method of calculating CMYK values for a color (e.g., an aim color) according to an embodiment. This method can be used to perform step 302 (FIG. 3A), or to calculate CMYK values for other colors. Processing begins with step 505.

In step 505, relative reflectances are received for the colors to be reproduced. For each color, the relative reflectances are the percentage of light reflected from the paper for red, green, and blue channels (of selected chromaticities), where 100% is the reflection in that channel of the receiver with no colorant on it. Step 505 is followed by step 510.

In step 510, dot areas for C, M, Y, and K are calculated from the relative reflectances using the Neugebauer or Yule-Nielsen equations, or modifications thereof. The dot areas are the percentage of the receiver to be covered by the colorant of the corresponding color channel. Step 510 is followed by step 515.

In step 515, a dot-gain or other calibration curve is used to calculate the commanded values to be sent to the printer to cause it to produce the desired percentage coverage corresponding to the dot areas. In embodiments, these commanded values correspond to output pixel levels 220 (FIG. 2).

Further details of various formulas useful with this process are found in Field, G. *Color and its reproduction*, Pittsburgh: Graphic Arts Technical Foundation, 1988, ISBN 0-88362-088-X; in U.S. Pat. No. 2,434,561 to Hardy et al., entitled "Color facsimile," dated Jan. 13, 1948; in commonly-assigned U.S. Provisional Application No. 61/106,172 by Kuo et al., filed Oct. 17, 2008, and in commonly-assigned co-pending U.S. Publication No. 2010/0097657 by Kuo et al. published Apr. 22, 2010 (claiming priority of 61/106,172), the disclosures of all of which are incorporated herein by reference.

Figure 6:
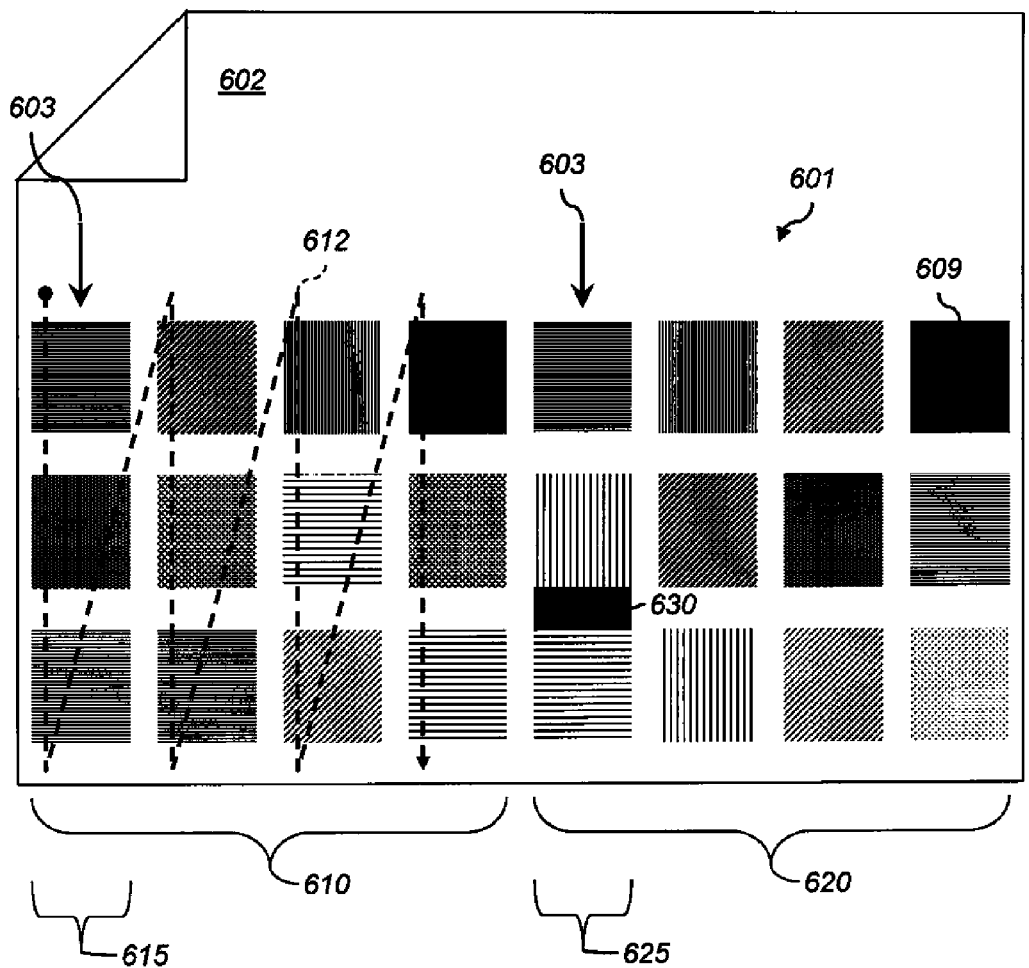
FIG. 6 is a representation of a test target.

FIG. 6 is a representation of a test target. Test target 601 is printed on receiver 602, which can be a page. Patch sets 610, 620 each contain 12 test patches (e.g. test patch 609), the patches arranged in three rows and four columns. Different hatching patterns and densities in FIG. 6 represent different colors and densities of patches. In this example, the top row of patches, left-to-right, is full-saturation CYMK in patch set 610 and full-saturation CMYK in patch set 620. First column 615 of patch set 610, top-to-bottom, is full C, a mid-gray, and another full C. First column 625 of patch set 620, top-to-bottom, is full C, a mid-tone M, and a mid-tone C. Printed arrows 603 are printed on receiver 602 to indicate where patch sets 610, 620 start. The patches are scanned top-to-bottom, left-to-right, as indicated for patch set 610 by scan path 612. In some embodiments, spacing patches 630 having high densities are located between patches of low densities to facilitate automatic detection of the edges of the test patches. The colors or densities of the spacing patches can be measured or ignored.

In other embodiments, the test colors in each patch set are printed in a single strip (row or column). This permits scanning with a spot scanner or wand by passing the scanner down the length of the strip.

In various embodiments, the second patch set includes a plurality of patches located within the gamut surface or gamut boundary of the patches in the first patch set but not themselves found in the first patch set. The gamut surface of the patches in the first patch set can be computed as a convex hull or other estimated enclosing surface, and can be computed in a 2-D or 3-D color space, such as CIELAB. It is not required that all patches in the first patch set be located on the gamut surface; some patches in the first patch set can be interior to the gamut surface, and some patches in the second patch set can be located on the gamut surface.

Figure 7:
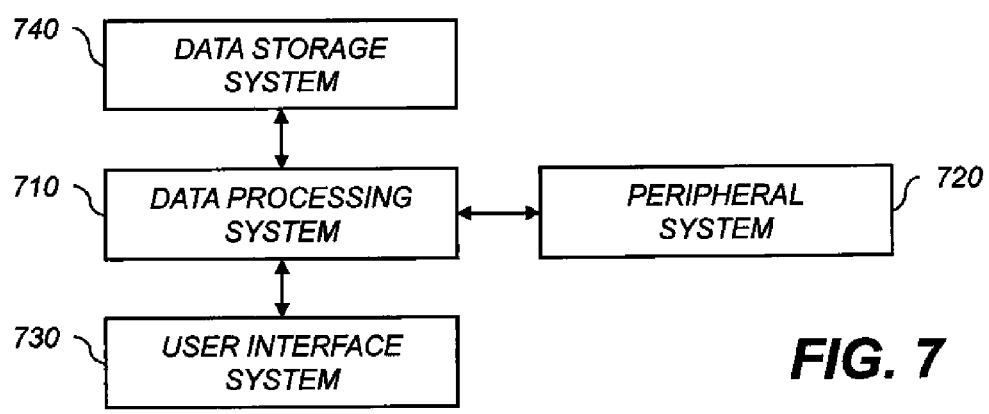
FIG. 7 is a high-level diagram showing the components of a processing system useful with various embodiments.

FIG. 7 is a high-level diagram showing the components of a processing system useful with various embodiments. The system includes a data processing system 710, a peripheral system 720, a user interface system 730, and a data storage system 740. Peripheral system 720, user interface system 730 and data storage system 740 are communicatively connected to data processing system 710.

Data processing system 710 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 740 includes one or more processor-accessible memories configured to store information, including the information needed to execute the processes of the various embodiments of the present invention, including the example processes described herein. Data storage system 740 can be a distributed processor-accessible memory system including multiple processor-accessible memories communicatively connected to data processing system 710 via a plurality of computers or devices. On the other hand, data storage system 740 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from data processing system 710, one skilled in the art will appreciate that data storage system 740 can be stored completely or partially within data processing system 710. Further in this regard, although peripheral system 720 and user interface system 730 are shown separately from data processing system 710, one skilled in the art will appreciate that one or both of such systems can be stored completely or partially within data processing system 710.

Peripheral system 720 can include one or more devices configured to provide digital content records to data processing system 710. For example, peripheral system 720 can include digital still cameras, digital video cameras, cellular phones, or other data processors. Data processing system 710, upon receipt of digital content records from a device in peripheral system 720, can store such digital content records in data storage system 740. Peripheral system 720 can also include a printer interface for causing a printer to produce output corresponding to digital content records stored in data storage system 740 or produced by data processing system 710.

User interface system 730 can include a mouse, a keyboard, another computer, or any device or combination of devices from which data is input to data processing system 710. In this regard, although peripheral system 720 is shown separately from user interface system 730, peripheral system 720 can be included as part of user interface system 730.

User interface system 730 also can include a display device, a processor-accessible memory, or any device or combination of devices to which data is output by data processing system 710. In this regard, if user interface system 730 includes a processor-accessible memory, such memory can be part of data storage system 740 even though user interface system 730 and data storage system 740 are shown separately in FIG. 1.

FIG. 8 is a representation of a test target according to the example discussed above with reference to FIG. 4. A portion of receiver 802 is shown; receiver 802 has printed on it test pattern 801 including a plurality of test patches (e.g., test patch 811). Master patch set 810 includes six patches 811, 812, 813, 814, 815, 816 of different colors, in this example arranged in a row to more clearly show the relationship between master patch set 810 and subsidiary patch sets 821, 822, 823, 824, 825 and 826. Master patch set 810 is scanned horizontally, as indicated by scan path 831. Subsidiary patch set 821 contains four patches (for clarity, only the first two are shown) within 5 $\Delta E^*$ of patch 811, the patch above them in master patch set 810. Likewise, subsidiary patch sets 822, 823, 824, 825, and 826 contain patches within 5 $\Delta E^*$ of patches 812, 813, 814, 815, and 816 respectively. Each subsidiary patch set is scanned vertically, as indicated for subsidiary patch set 821 by scan path 832. No particular spatial relationship between master and subsidiary patch sets is required; in an embodiment, all patch sets are strips and the master patch set is in a strip parallel to the strips for the subsidiary patch sets.

Figure 9:
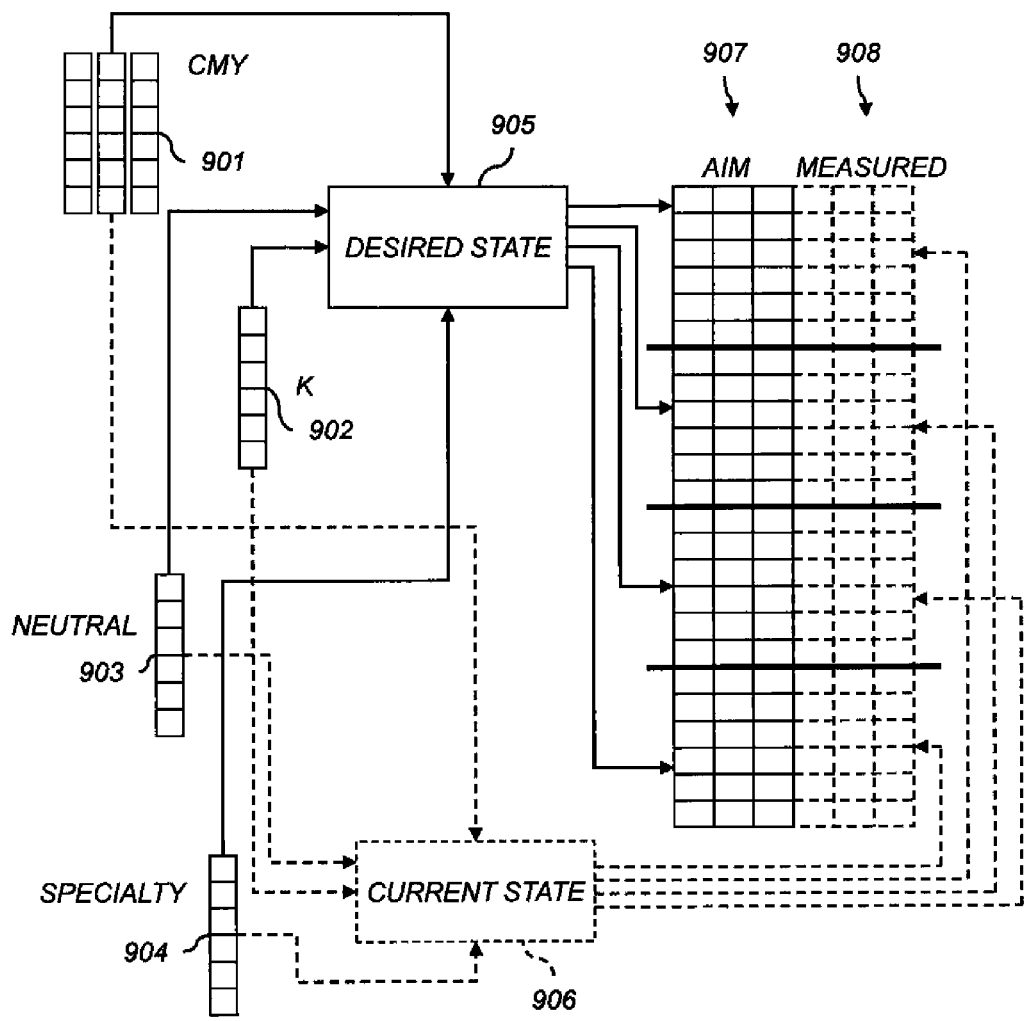
FIG. 9 is a schematic of a process useful with various embodiments.

FIG. 9 is a schematic of a process useful with various embodiments. Four color channels (CMYK) are shown, but this process can be extended to more color channels. CMY ramp 901 is a patch set including a plurality of test patches of different densities for each of the cyan, magenta, and yellow color channels, as discussed above. K ramp 902 is a patch set including a plurality of test patches of different densities for the black channel. Neutral ramp 903 is a patch set including a plurality of neutral colors of different densities. Specialty set 904 is a patch set including colors to which the eye is particularly sensitive, or which have particularly tight tolerances (e.g., corporate trade dress colors or PANTONE colors). Examples of specialty colors are:

| Category | L* | a* | b* |
|---|---|---|---|
| Caucasian Skin Indoor w/Flash | 56 | 22 | 29 |
| Caucasian Skin Indoor w/o Flash | 64 | 27 | 38 |
| Caucasian Skin Outdoor | 72 | 20 | 20 |
| Caucasian | 64 | 27 | 38 |
| Asian | 74 | 12 | 22 |
| Indian | 55 | 23 | 30 |
| African | 40 | 18 | 29 |
| Sky (desert) | 50 | −2 | −46 |
| Sky (grass) | 54 | −2 | −44 |
| Sky (snow) | 61 | −4 | −43 |
| Grass (field) | 49 | −33 | 51 |
| Grass (golf) | 59 | −31 | 41 |
| Grass (house) | 42 | −30 | 42 |

Desired state 905 is the state of a printing system at the time of generating the associated ICC profiles or other calibration data, which data characterize color printers. Current state 906 represents the current state of the printing system, which can be different from state 905. Based on the prior information characterized in the ICC profile, the aim colors 907 are calculated in the device independent space CIELAB. After the test target (including patches from ramps 901, 902, and 903, and specialty set 904) is printed by the printer with current state 906, the patches are measured, resulting in the measured colors 908 (also in CIELAB). The color difference associated with each color patch is then computed from aim color 907 and measured color 908. Further details can be found in the above-referenced '343 patent.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

| PARTS LIST | |
|---|---|
| 21 | charger |
| 21a | voltage source |
| 22 | exposure subsystem |
| 23 | toning station |
| 23a | voltage source |
| 25 | photoreceptor |
| 25a | voltage source |
| 31, 32, 33, 34, 35 | printing module |
| 38 | print image |
| 39 | fused image |
| 40 | supply unit |
| 42, 42A, 42B | receiver |
| 50 | transfer subsystem |
| 60 | fuser |
| 62 | fusing roller |
| 64 | pressure roller |
| 66 | fusing nip |
| 68 | release fluid application substation |
| 69 | output tray |
| 70 | finisher |
| 81 | transport web |
| 86 | cleaning station |
| 99 | logic and control unit (LCU) |
| 100 | printer |
| 200 | input pixel levels |
| 205 | workflow inputs |
| 210 | image-processing path |
| 220 | output pixel levels |
| 250 | screening unit |
| 260 | screened pixel levels |
| 270 | print engine |
| 301 | select aims step |
| 302 | calculate CMYK step |
| 305 | print calibration target step |
| 310 | scan a set step |
| 315 | scanned patch data |
| 317 | determine which set was scanned step |
| 320 | determine reproduction error value step |
| 325 | reproduction error value |
| 330 | determine next set step |
| 335 | all sets scanned? decision step |
| 336 | reproduction error value < threshold? decision step |
| 338 | direct scanning of next set step |
| 340 | generate calibration data step |
| 350 | receive input data step |
| 360 | process input data step |
| 370 | print output data step |
| 405 | select test colors step |
| 410 | select successor relationships step |
| 415 | divide colors and determine order step |
| 420 | print patch sets in order step |
| 505 | receive relative reflectances step |
| 510 | calculate dot areas step |
| 515 | calculate commanded values step |
| 601 | test target |
| 602 | receiver |
| 603 | printed arrow |
| 609 | test patch |
| 610 | patch set |
| 612 | scan path |
| 615 | first column |
| 620 | patch set |
| 625 | first column |
| 630 | spacing patch |
| 710 | data-processing system |
| 720 | peripheral system |
| 730 | user-interface system |
| 740 | data-storage system |
| 801 | test pattern |
| 802 | receiver |
| 810 | master patch set |
| 811, 812, 813, 814, 815, 816 | patch |
| 821, 822, 823, 824, 825, 826 | subsidiary patch set |
| 831, 832 | scan path |
| 901 | CMY ramp |
| 902 | K ramp |
| 903 | neutral ramp |
| 904 | specialty set |
| 905 | desired state |

-continued

PARTS LIST

| | |
|---|---|
| 906 | current state |
| 907 | aim colors |
| 908 | measured colors |
| 1010 | print target step |
| 1020 | scan master patch set step |
| 1025 | master scanned patch data |
| 1030 | compare to aims step |
| 1035 | master reproduction error values |
| 1040 | determine subsidiary sets to scan step |
| 1050 | direct scanning of determined sets step |
| 1060 | receive scanned patch data step |
| 1065 | subsidiary scanned patch data |
| 1070 | generate calibration data step |

The invention claimed is:

1. A method of providing calibration data for a printer, comprising:

printing a calibration target using the printer, the calibration target including a master patch set and a plurality of subsidiary patch sets, each patch set including a plurality of test patches, each test patch having a respective color, wherein each subsidiary patch set is associated with one of the test patches in the master patch set;

receiving from a spot scanner scanned patch data values for the test patches in the master patch set;

comparing the scanned patch data values to respective aims to determine a reproduction error value for each test patch in the scanned master patch set;

using a processor to automatically determine which of the subsidiary patch sets should be scanned based on comparing the calculated reproduction error value for the associated test patch in the scanned master patch set with a predefined threshold;

directing the spot scanner to scan the determined subsidiary patch sets;

receiving from the spot scanner scanned patch data values for the test patches in the determined subsidiary patch sets;

automatically generating the calibration data using the scanned patch data values for the master patch set and the determined subsidiary patch sets.

2. The method according to claim 1, wherein the calibration data are automatically generated using the scanned patch data values and respective aims.

3. The method according to claim 1, further including operating the printer by:

receiving input data for a job to be printed;

automatically processing the input data with the generated calibration data to produce output data; and printing the output data using the printer.

4. The method according to claim 1, wherein the test patches in the each of the subsidiary patch sets have a defined color relationship to the associated test patch in the master patch set.

5. The method according to claim 1, wherein the test patches in the each of the subsidiary patch sets have colors that are less than a specified threshold color difference from the associated test patch in the master patch set.

* * * * *